United States Patent [19]
Mei et al.

[11] Patent Number: 5,198,002
[45] Date of Patent: Mar. 30, 1993

[54] GAS STREAM CLEAN-UP FILTER AND METHOD FOR FORMING SAME

[75] Inventors: Joseph S. Mei, Morgantown; James DeVault, Fairmont, both of W. Va.; John S. Halow, Waynesburg, Pa.

[73] Assignee: The United States of America as represented by the United States Department of Energy, Washington, D.C.

[21] Appl. No.: 850,478

[22] Filed: Mar. 12, 1992

[51] Int. Cl.$^5$ .............................. B01D 53/06
[52] U.S. Cl. .......................... 55/77; 55/97; 55/99; 55/320; 55/387; 55/474; 55/523
[58] Field of Search ............ 55/73, 74, 77, 79, 96, 55/97, 98, 99, 181, 262, 316, 320, 341.1, 341.5, 341.6, 361, 372, 387, 474, 486, 487, 523, 524, 525; 210/193

[56] References Cited

U.S. PATENT DOCUMENTS

| | | | |
|---|---|---|---|
| 2,548,875 | 4/1951 | Degnen et al. | 23/1 |
| 4,289,630 | 9/1981 | Schmidt et al. | 210/785 |
| 4,343,631 | 8/1982 | Ciliberti | 55/302 |
| 4,464,184 | 8/1984 | Cera et al. | 55/262 XY |
| 4,728,503 | 3/1988 | Iida et al. | 55/316 X |
| 4,904,380 | 2/1990 | Bhanot et al. | 210/193 |
| 4,973,458 | 11/1990 | Newby et al. | 55/73 X |

OTHER PUBLICATIONS

"Cold flow studies of a novel fluidized bed emissions clean-up concept" Yang et al, Powder Tech. 63 pp. 55–68, 1990.

*Primary Examiner*—Charles Hart
*Attorney, Agent, or Firm*—David E. Breeden; Stephen D. Hamel; William R. Moser

[57] ABSTRACT

A gas cleaning filter is formed in-situ within a vessel containing a fluidizable bed of granular material of a relatively large size fraction. A filter membrane provided by a porous metal or ceramic body or such a body supported a perforated screen on one side thereof is coated in-situ with a layer of the granular material from the fluidized bed by serially passing a bed-fluidizing gas stream through the bed of granular material and the membrane. The layer of granular material provides the filtering medium for the combined membrane-granular layer filter. The filter is not blinded by the granular material and provides for the removal of virtually all of the particulates from a process gas stream. The granular material can be at least partially provided by a material capable of chemically reacting with and removing sulfur compounds from the process gas stream. Low level radioactive waste containing organic material may be incinerated in a fluidized bed in communication with the described filter for removing particulates from the gaseous combustion products.

28 Claims, 3 Drawing Sheets

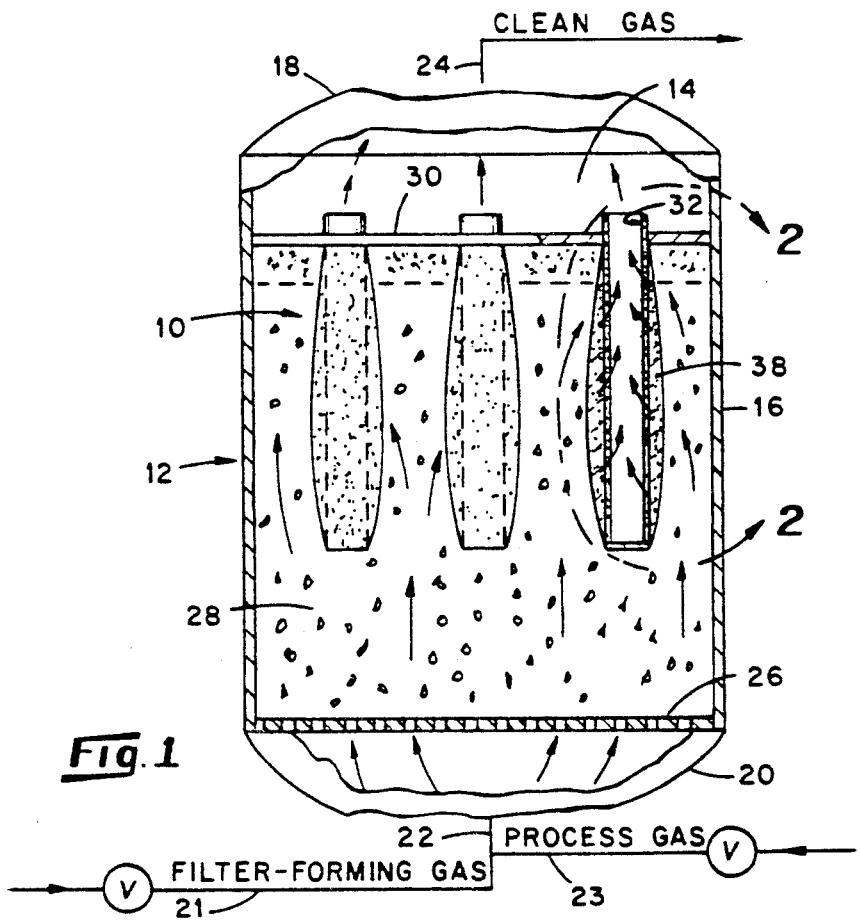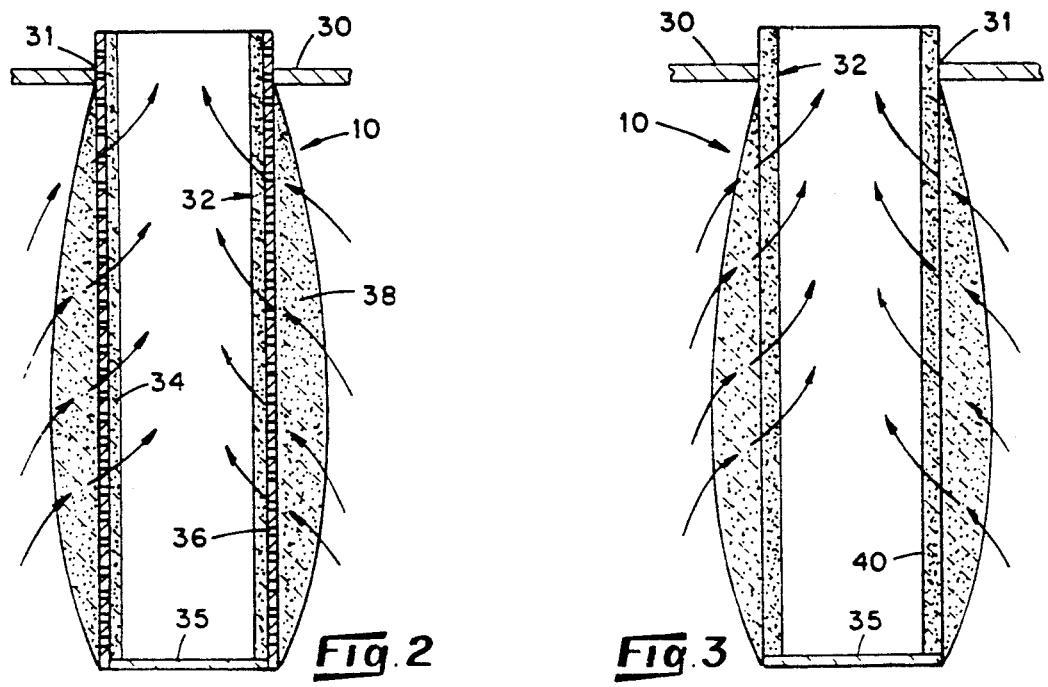

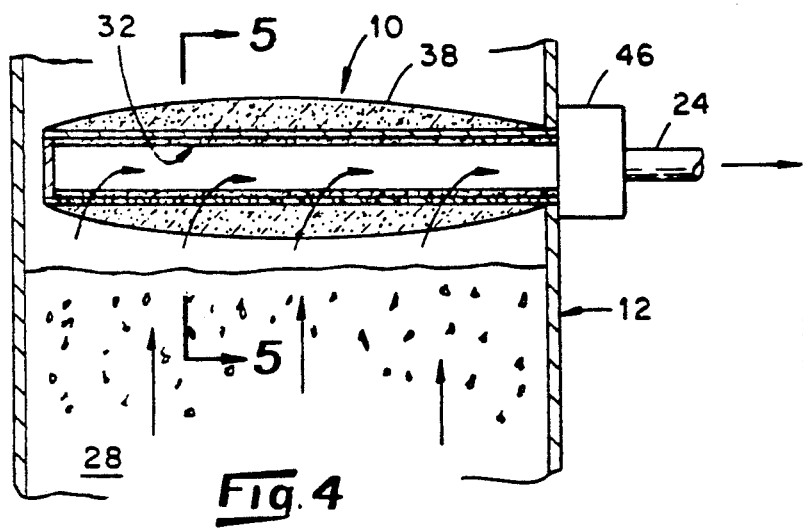
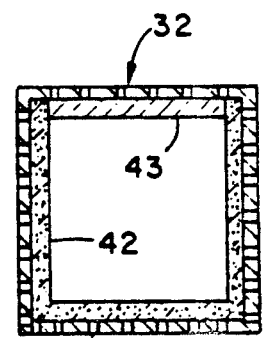
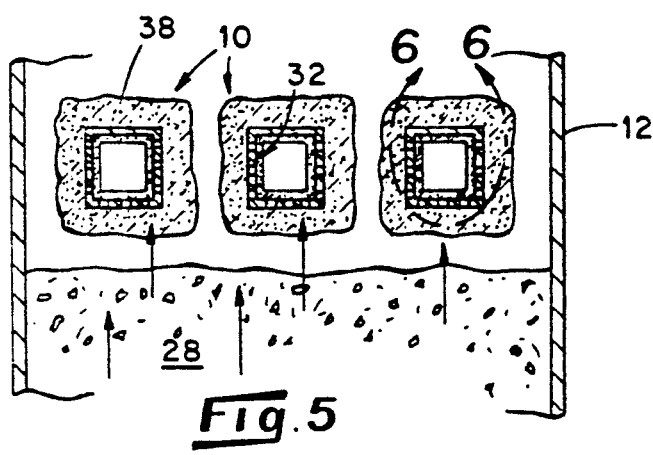
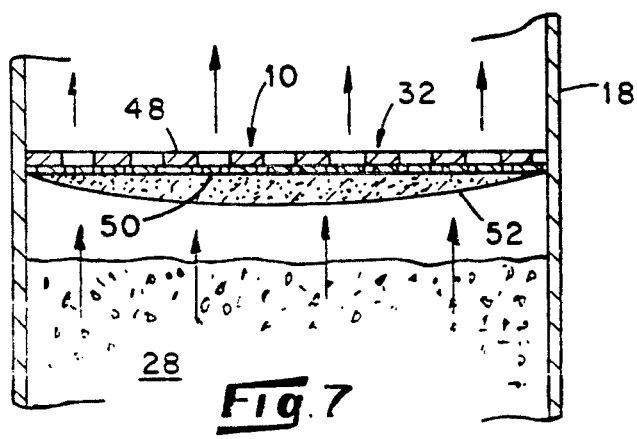

GAS STREAM CLEAN-UP FILTER AND METHOD FOR FORMING SAME

The United States Government has rights in this invention pursuant to the employer-employee relationship of the U.S. Department of Energy and the inventors.

BACKGROUND OF THE INVENTION

The present invention relates generally to a filter arrangement for cleaning particulate laden process gas streams such as provided by coal gasification processes or the incineration of organic material. More particularly, the present invention is directed to a filter provided in combination with a fluidized bed of granular material and formed in-situ by depositing a gas permeable and substantially particulate-impermeable layer of granular bed material on an exposed surface of a porous membrane.

Gas filtering mechanisms for efficiently and effectively removing gas borne particulate material and gaseous pollutants such as sulfur oxides and hydrogen sulfide from process gas streams are becoming increasingly important in the development and use of coal utilization devices such as combined cycle turbines, direct fired combustion turbines, coal gasification systems, and fuel cells. The successful operations of such coal utilization devices require reliable and efficient gas stream clean-up mechanisms which can remove particulate and gaseous pollutants from the process gas stream before the stream is discharged into the environment or employed in a process-gas utilization device such as gas turbine or fuel cell. Also, the incineration of waste material such as low level radioactive waste containing organic material such as clothing, liquids including oily waste, and building materials is of present interest in order to reduce the increasingly large inventory of such radioactive waste. The filtering of the gas stream emanating from such an incinerator is required to prevent the discharge of hazardous radioactive particulate material into the environment.

Presently available filtering mechanisms for cleaning high temperature and high pressure gas streams laden with particulate material and gaseous pollutants such as those discharged from fluidized beds and gasification systems have been largely successful in removing about 99% or more of the particulate material from such gas streams. These filtering mechanisms include screenless granular bed filters, ceramic cross-flow filters such as described in U.S. Pat. No. 4,343,631, and metal or ceramic candle filters as described in U.S. Pat. No. 2,548,875.

Screenless granular bed filters utilize the granules in a fixed or moving bed as the particulate capturing mechanism to remove greater than about 99% of the particulate material from relatively slow moving particulate-laden gas streams passing through the bed at substantially constant gas pressures and velocities. However, this type of filter has some problems with respect to variations in gas pressure and gas velocity since it is relatively sensitive to any changes in the pressure of the gas and to gas streams contacting the bed at relatively high velocities in that such changes in pressure and gas streams passing through the bed at relatively high velocities tend to inhibit the capture of a desired percentage of the gas-borne particulates from the particulate laden gas streams.

The cross-flow filters and the candle filters employ porous ceramic or metal filtering elements which are permeable to gas and essentially impermeable to particulate material including even the very fine particulates in the 0+ to 5 micron range so as to effectively remove 99+% of the particulates from the process gas stream passing through the filtering elements. While these filters have been found to be efficient for removing virtually all of the particulate material from process gas streams, these filters do encounter a problem in that the particulate material borne by the process gas forms a relatively dense particulate deposit or filter cake on the surface of the filter. As this build-up of the filter cake continues, the flow of gas through the filter becomes increasingly restricted to cause an excessive pressure drop across the filtering element so as to necessitate relatively frequent removal of the filter cake, such as by high pressure blow-back procedures.

SUMMARY OF THE INVENTION

A principal aim or objective of the present invention is to provide an improved filter for removing virtually all of the environmental pollutants and/or particulate material from process gas streams such as derived from coal conversion processes and incinerators for organic-containing waste such as low level radioactive waste. The filter is provided in combination with a fluidized bed of granular material and is formed in-situ by employing a gas permeable membrane within or suspended above the fluidized bed. A gas stream is passed through the fluidized bed to entrain granular material therefrom and deposit granular material on exposed porous surface regions of the membrane as the gas passes through the membrane until these porous surface regions of the membrane are covered with a gas filtering layer of granular material. This granular coating or layer provides the filtering medium for the filter which is capable of removing virtually all of the particulate matter from various process gas streams including fine particulates in the size range from 0+ to 5 microns. Inasmuch as the filtering medium of the filter of the present invention is primarily provided by a layer of granular material derived from the fluidized bed, the so formed filter is not subject to filter blinding, is easily cleaned at periodic intervals, and is not readily subject to mechanical failures. The thickness and density of the solid particulate layer deposited on the porous regions of the membrane are variables dependent upon the gas velocity, pressure and bed granular size so that the filter can be designed to operate at ambient or elevated pressures, at high or low temperatures, and at various gas velocities.

Also, the filter of the present invention can be used to remove gaseous pollutants such as sulfur oxides, hydrogen sulfide as well as particulate material from process gas streams. In such instances, the granular material or at least a portion of the granular material forming the fluidized bed is provided by a chemically active material such as calcium oxide, calcium carbonate, sodium carbonate, alumina silicates, zinc ferrite, zinc titanate or any other suitable sulfur sorbents for reacting with and removing the gaseous pollutants and particulate material from the process gas stream.

Other and further objects of the present invention will become obvious upon an understanding of the illustrative embodiments about to be described or will be indicated in the appended claims, and various advantages not referred to herein will occur to one skilled in the art upon employment of the invention in practice.

DESCRIPTION OF THE DRAWINGS

FIG. 1 is a vertical, partially sectional View of a vessel containing a fluidized bed of granular material with the combined membrane-granular layer filters of the present invention vertically positioned within the fluidized bed;

FIG. 2 is a view taken along lines 2—2 of FIG. 1 illustrating a single filter formed of a perforated tube supporting a screen that is coated with a porous gas-filtering layer of granular solids from the fluidized bed;

FIG. 3 is a view of a single filter as in FIG. 2 but showing another embodiment of a filter of the present invention which is formed of a porous metal or ceramic tube coated with a gas filtering layer of granular solids from the fluidized bed;

FIG. 4 is a sectional side view of a vessel containing a fluidized bed as in FIG. 1 but illustrating a further embodiment of the air cleaning filter of the present invention which is provided by a plurality of horizontally disposed screen-covered perforated tubes overlying a fluidized bed and coated with the gas filtering layer of the granular material from the fluidized bed;

FIG. 5 is an end view of the FIG. 4 embodiment showing further details of the gas cleaning filters;

FIG. 6 is an enlarged sectional end view of the screen-covered perforated tube used for forming the filter in the FIG. 4 embodiment;

FIG. 7 is a vertical sectional view of a vessel containing a fluidized bed as in FIG. 1 but showing a still further embodiment of the present invention which is provided by a filter formed of a perforated plate and screen membrane disposed in a horizontal orientation intermediate to the fluidized bed and the gas outlet of the vessel and coated with a layer of granular bed material.

Figure 8:
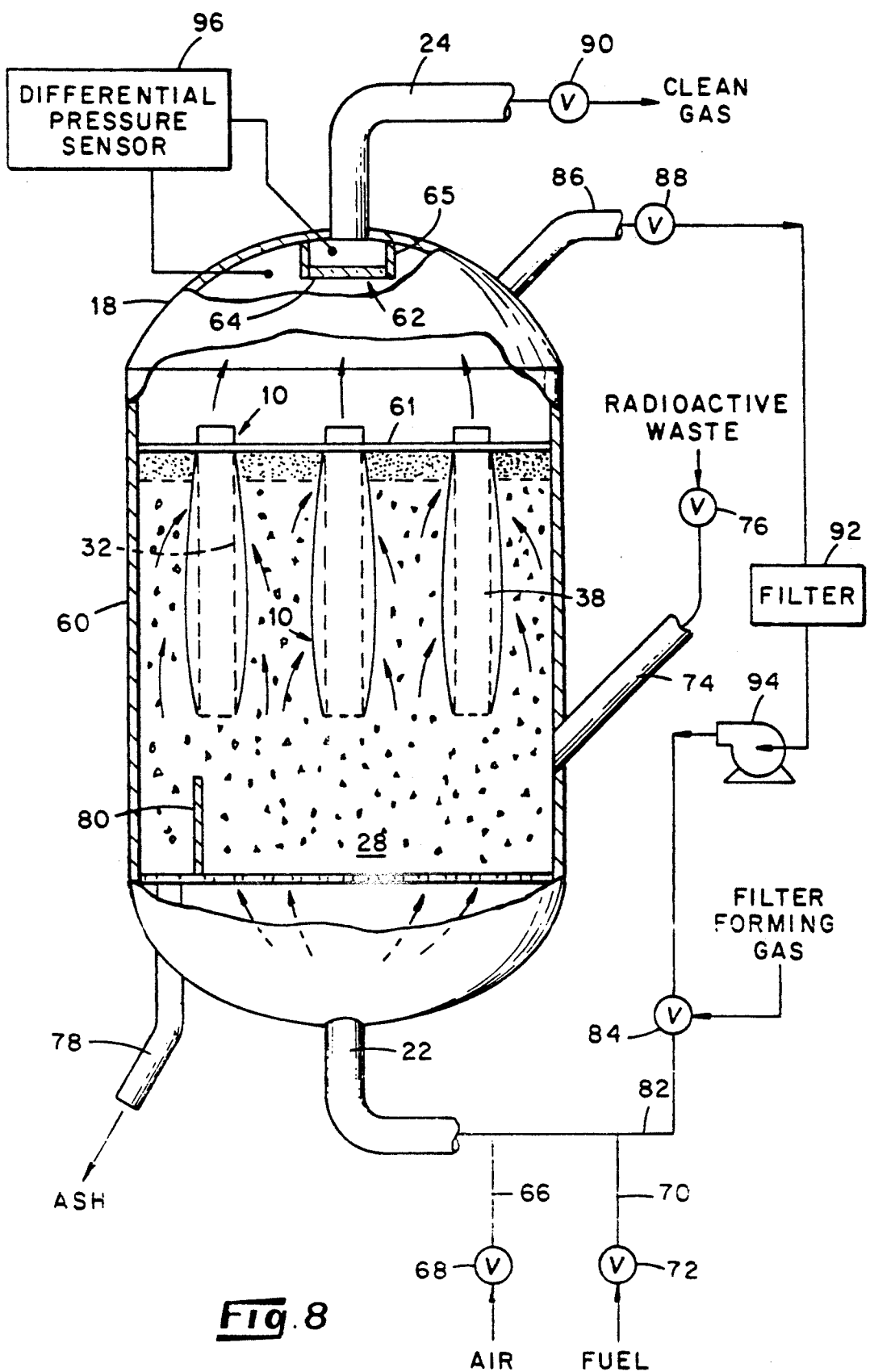
FIG. 8 is a still further embodiment of the present invention wherein the fluidized bed is utilized for the incineration of organic-containing low level radioactive waste with the filtering of the gases emanating from the fluidized bed being achieved with filters as shown in the FIGS. 1-3 embodiments.

Preferred embodiments of the invention have been chosen for the purpose of illustration and description. The preferred embodiments illustrated are not intended to be exhaustive nor to limit the invention to the precise forms shown. The preferred embodiments are chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

With reference to FIGS. 1-7, the three filters of the present invention as generally shown at 10 mounted in a pressure vessel or housing 12 having a central cavity or chamber 14 defined by cylindrical side wall 16 and enclosed by a top end 18 and a bottom end 20. A gas inlet 22 is provided in the bottom 20 of the vessel 12 for introducing the gas for forming the filter through the valved-line 21 and for subsequently introducing through valved-line 23 the process or particulate-laden gas-containing particulates in a size range from about 0+ microns upwards as well as gaseous environmental pollutants such as hydrogen sulfide and sulfur oxides. A gas outlet 24 is placed in the top 18 of the vessel 12 for discharging the clean process gas stripped of greater than about 99% of the particulates borne by the process gas entering the vessel 12 and, if desired, essentially all of the gaseous environmental pollutants supported in the process gas. A perforated distributor 26 is horizontally positioned in the vessel 12 near the bottom 20 for supporting a fluidizable bed 28 of particulate or granular material that is fluidized by the filter forming gas and the process gas.

The granular material providing the fluidized bed 28 is initially loaded into the vessel 12 above the distributor 26 by employing a suitable inlet (not shown) and is used to form in-situ the particulate filtering medium of the filter 10. The granular material initially employed in the fluidized bed is of a particle size in a range of about 100 to 1,000 microns and is composed of an inert material such as silicon oxide, silicon nitrite, or crushed and sized stone. Alternatively, the granular material in the bed 28 may be provided in part or entirely by a chemically reactive material such described above for reacting with and removing essentially all of the gaseous pollutants such as sulfur oxides and hydrogen sulfides as well as particulate matter from the process gas.

In the embodiments of FIGS. 1-7, a particulate-laden process gas from a suitable source such as a coal gasifier or other coal conversion process or from the combustion of oily fuels such as coal and sludge is introduced through line 23 into the vessel 12 through the gas inlet 22 and percolates up through the fluidized bed 28 and contacts the filter 10 where virtually all of the particulate material borne by gas is removed. By passing the process gas through the fluidized bed, a substantial percentage of the particulates borne by the gas is stripped from the gas by the bed material. Gaseous environmental pollutants are also removed by the bed material and the filter if the chemically reactive material provides at least part of the bed material.

With particular reference to the embodiments shown in FIGS. 1-3, a horizontal plate 30 having throughgoing apertures or passageways 31 is positioned at a location near the top 18 of the vessel for supporting the vertically oriented filters 10 in each of the passageways 31 in the plate 30. The horizontal plate 30 is positioned in the vessel 12 at a location overlying the fluidized bed 28. The filter 10 in the embodiment of FIGS. 1 and 2 comprises a base structure provided by a porous membrane 32 formed of an elongated cylindrical and perforated or porous steel or ceramic tube 34 closed with a non-porous plate 35 at the bottom end and provided with an open top end. A metal screen 36 is placed about the tube 34 and is supported by the latter to form the membrane 32 of the filter 10. The tube 34 with the metal screen 36 positioned thereabout is supported by the horizontal plate 30 with the tube 34 extending into the fluidized bed 28 in such a manner that a section of tube with the open upper end is located above the horizontal plate 30 so that any gas entering the inlet 22 of the vessel 12 will serially flow through the fluidized bed 28, the filter 10, and then through the gas outlet 24. The porous or perforated steel tube or the ceramic tube 34 supports the screen 36 and is of a thickness sufficient to withstand the pressure differentials that are expected to be encountered across the filter 10. The tube 34 has a throughgoing porosity provided by perforations or open pores in the metal tube or the open pores in the ceramic tube with these perforations or pores being of a size substantially larger than that of the smaller sized particulates to be removed from the gas stream by the filter 10. The pores in the tube 34 may be of a size which would permit passage of substantially all of the particulate matter borne by the gas since the tube 34 merely provides a support for the metal screen 36.

The screen 36 is provided with perforations of a mesh size in the range of about 80 to about 115 mesh (Tyler) or about 125–177 microns. Preferably, the screen perforations are about 100 mesh size (149 microns). With perforations in such a size range in the screen 36 which is supported on the tube 34 over the entire portion thereof located under the horizontal plate 30, the perforations or throughgoing pores are of a size substantially larger than that of the smallest size fraction of the particulate material to be removed from the process gas stream by the filter 10.

The removal of virtually all of the smaller sized particulate material and all of the larger particulates from the process gas stream is provided by a layer or coating 38 of granular material deposited on the surface regions of the screen 36 exposed to the fluidized bed 28. In the in-situ formation of this coating or layer 38 of particulate or granular bed material on the outer surface of the screen 36, a gas such as air in line 21 is introduced through the vessel inlet 22 at the pressure and velocity preferably corresponding to that of the process gas stream to be filtered. As this stream of gas percolates through the bed 28 and fluidizes the latter, it entrains particulate material from the fluidized bed and deposits the gas-borne bed material on the outer surface of the screen 36 as the gas passes through the screen 36 and tube 34 and then exits from the vessel 12 through the outlet 24. The depositing of the layer 38 is continued until it is of a suitable thickness or particle density. The desired thickness or density of the layer 38 is such that it will provide for the removal of essentially all, i.e., greater than 99 percent, of the particulates from the process gas stream of a size with these particulates ranging in size from a small size fraction of about 0+ to 5 microns to the largest particulates borne by the process gas stream. The formation of this coating of desired thickness can be readily determined by introducing into the filter-forming gas particulates of the smallest size fraction to be removed from the gas by filter 10 after the layer 38 is nearly established, and then monitoring the gas discharged through the outlet 24 until the desired level of filtering is achieved. Alternatively, this determination may be provided by recirculating the particulate-laden process gas through the vessel 12 after the layer 38 is nearly formed until essentially all of the particulate matter is filtered from the gas.

The formation and maintenance of this coating or layer 38 of particulates on the surface regions of the membrane exposed to the fluidized bed are important aspects of the present invention since this layer 38 of particulates provides the filtration medium for removing particulates including the ultra-fine particulates from the process gas stream. A critical aspect of the present invention is to provide for the formation of the layer 38 by using relatively large sized granules in the fluidized bed in order to assure that the layer 38 will be sufficiently porous to provide for the passage of the gas during the filtering thereof. If granular material of a size from much less than about 100 microns is used for the formation of the layer 38, the resulting density of the layer would be so great as to substantially inhibit the flow of gas through the filter 10. Inasmuch as the layer 38 is formed of the bed particulates, the layer 38 is not subject to blinding by the bed particulates.

In the event the particulate layer 38 becomes sufficiently plugged with the small particulates conveyed by the process gas so as to create an excessive pressure drop across the filter 10, the cleaning of the filter 10 can be readily achieved by momentarily interrupting the gas flow through the vessel 12 since it is the velocity and pressure of the gas rather than the cohesive forces between granules in the layer 38 which maintains the granular layer 38 on the outer surface of the membrane 32. Upon interrupting the gas flow, the layer 38 of particulates, in effect, drops from the surface of the filter membrane 32. In the event cleaning of the filter 10 is required, the flow of the process gas through the vessel 12 is interrupted and then the filter forming gas is reintroduced into the vessel 12 until the layer 38 is reestablished on the filter. Alternatively, if desired, the process gas may be recycled through the vessel until the layer 38 of granular material is reestablished on the surface of the membrane 32 and then the filtering of the process gas may proceed as desired. However, it is believed that in most instances, the filter 10 will be self cleaning since the build-up of fine particulate material on the outer surface of the established layer 38 in effect reduces the gas flow through the filter so as to eliminate the forced holding of the outermost particulates on the layer 38 and thereby causing these particulates to fall from the outer surface of the layer 38 back into the bed 28.

The embodiment of FIG. 3 is essentially similar to that of FIG. 2 except that the membrane 32 is provided by a porous metal or ceramic tube 40 having a pore size corresponding to that of the metal screen 36. In this embodiment, the build-up of the layer 38 is directly on the outer surface of the porous tube 40 so as to function like the combined screen 36 and tube 34 arrangement shown in FIG. 2. As in the embodiment of FIG. 2, the porous tube 40 is of a sufficient thickness to maintain structural integrity during the various pressure drops encountered across the filter 10 during the filtering of a process gas stream.

A further embodiment of the present invention is illustrated in FIGS. 4–6 and is provided by horizontally positioning a plurality of filters 10 in the upper region of the vessel at a location overlying the fluidized bed 28. Membranes 32 for these filters 10 are provided by employing porous rectangular metal or ceramic tubes 42 formed like tubes 34 in the embodiment of FIGS. 1–3 except that the perforations or pores are only on the sides and the bottom surface of the tubes 42. The upper surface 43 of the tubes 42 is not porous or perforated since the build-up or deposit of the granular material on top of the tube 42 is not provided by the velocity-pressure forces envisioned for providing the formation of the porous granular layer 38 on the sides and bottom of the filter 10 when the tubes 42 are encompassed by perforated screens 44 similar to the screens 36 in the embodiments of FIGS. 1–3. In this arrangement, the horizontal tubes 42 with the screens 44 supported thereon extend through the horizontal cross-section of the vessel 12 with a portion of each tube 42 at the open end thereof extending into or communicating with a chamber or manifold 46 positioned on the side of the vessel 12 for receiving the gas passed through the filters 10. The filters 10 are shown as being cantileveredly supported by the manifold 46 but can be supported in the vessel by any suitable means. The cleaning of these horizontally positioned filters 10 may be readily achieved in manners similar to those used for cleaning the vertical filters 10 in the embodiments of FIGS. 1–3. During such cleaning, the deposit of particulate material on top of the filters 10 may remain in place since no filtering occurs through this top surface of the filter 10.

A still further embodiment of the filter of the present invention is illustrated in FIG. 7. The filter 10 is provided by membrane 32 formed of a horizontally disposed perforated plate 48 mounted in the upper region of the vessel 12 and overlying the fluidized bed 28 and a metal screen 50 bearing against the underside of the perforated plate 48. The screen is provided with perforations or pores of a size similar to those in the screens in the previously described embodiments. As the stream of particulate laden gas passes through the bed 28 during the in-situ formation of the filter, a layer 52 of bed particulates is deposited on the screen 50 and is held in place by the pressure and velocity of the gas stream passing through the filter 10 so as to provide the filtering medium required for the cleaning of the process gas. As in the above described embodiments, once the layer 52 is established on the underside of the screen 50, the filtering of the process gas stream may proceed. Also, the cleaning of this filter may be readily achieved simply by momentarily terminating the gas flow so as permit the layer 52 to drop back into the bed. However, prior to passing the process gas back through the filter 10 for cleaning purposes, the layer 58 should be reestablished by either recirculating the process gas until the filter layer 52 is reformed or by using a separate gas such as air or the like to form the filter layer 52 prior to the passing of the process gas stream through the filter 10.

While the filter embodiments of FIGS. 1–7 have been described as being used for cleaning process gas, it will appear clear that a combustion process utilizing oily fuels such as coal, sludge, and the like can take place in the fluidized bed with the filters 10 removing particulates from the gaseous products of combustion.

The embodiment of the present invention illustrated in FIG. 8 is used in a fluidized bed in which organic material such as contained in low level radioactive waste is incinerated so as to significantly reduce the volume of such radioactive waste. In this embodiment, the vessel 60 used for supporting the filters and the fluidized bed wherein the incineration of the organic material takes place may be essentially the same as the vessel 12 in the embodiments of FIGS. 1–7 except that vessel 60 preferably provides a sealable modular unit or assembly so that in the event there is a malfunction in the unit such as caused by a filter failure, the entire unit is taken off-line and then replaced with a similar modular unit. By using sealable modular gas filtering units, the unit itself can provide for long term storage of the radioactive waste. Also, by using readily replaceable modular units, the hazards that would be associated with component or filter replacements is obviated.

As shown in FIG. 8, the primary filtering mechanisms are shown provided vertically oriented filters 10 of the type utilized in the embodiments of FIGS. 1–3. These filters 10 are supported by a horizontal plate 61 corresponding to plate 30 in FIGS. 1–3. In the FIG. 8 embodiment, an additional filter 62 is placed near the outlet with this filter 62 being provided by a porous ceramic disc 64 mounted within a cylindrical receptacle 65 projecting into the upper region. The filter 62 separates the filters 10 from the outlet 24 of the pressure incinerating vessel 60 and is provided with a surface area and porosity sufficient to permit the gases exiting the filters 10 to pass therethrough and out of the vessel 60 without creating a substantial pressure drop across the filter 62. If necessary, the surface area of the filter 62 can be increased considerably from that shown in FIG. 8 in order to provide a minimal pressure drop across the filter 62 during normal operation of the incinerator in vessel 60.

To effect the incineration of the radioactive waste in vessel 60, an air line 66 is connected to the inlet 22 through a suitable valve 68. A fuel line 70 is also coupled to the inlet 22 and is provided with a valve 72. Any suitable liquid or gaseous fuel may be used for the incineration of the organics in the radioactive waste. The quantity of fuel introduced into the vessel 60 depends upon the type and volume of organics being incinerated since considerable fuel values may exist in the organic materials. The volume of the combustible air-fuel mixture into the fluidized bed 28 is sufficient to incinerate the volume of low level radioactive waste introduced into vessel 60 in the lower region of the fluidized bed through a line 74 containing a suitable valve 76. Solid granules including portions of the initial bed material and ash resulting from the incineration of the low level radioactive waste is discharged from the fluidized bed 28 through a discharge line 78 which is in communication with the fluidized bed 28 and separated therefrom by a suitable baffle arrangement 80 which permits for the selective discharge from ash from the fluidized bed 28.

In the FIG. 8 embodiment, the layer 38 of the particulate material provided the filtering medium is formed on the outer surface of a membrane 32 provided by a tube supported screen or a porous ceramic tube by passing a suitable gas such as air through line 82 coupled to the inlet 22 at a pressure and velocity corresponding to the pressure and velocity which will be experienced during the incineration of the radioactive waste. This gas line 82 is shown provided with a suitable valve 84 so that the flow of the filter-forming gas through the line 82 can be introduced into the vessel 60 prior to the introduction of the fuel and combustion supporting air so as to establish the layer 38 of the relatively large bed granules on the outside of the filter membranes. Once this layer 38 is established, the radioactive waste may be introduced into the fluidized bed 28 through line 74 and the fuel and air introduced into the vessel 60 through inlet 22 for the combustion or incineration of the organics in the radioactive waste within the vessel 60.

During the formation of the granular layer 38 on the filter membranes 32, the filter-forming gas passing through the membranes 32 is not passed through filter 62 since this gas prior to the completion of the filter layer 38 carries relatively small particulate matter which may cause some plugging of the pores in the filter 62 and thereby detract from its intended purpose as will be described below. In order to avoid the passing of the filter-forming gas through filter 62, the top end 18 of the vessel 60 is provided with another outlet 86 containing a valve 88. A valve 90 in outlet 24 is closed and filter-forming gas is discharged from the vessel 60 through outlet 86 until the filters 10 are formed. Once the filters 10 are so formed, the flow of the filter-forming gas is stopped and replaced with the air through line 66 without any significant decrease in velocity or pressure in order to assure the integrity of the filter layer 38.

Alternatively, if desired, the layer 38 of particulate material on the outer surface of the membranes 32 of the vertically extending filters may be reestablished by recirculating the gaseous combustion products resulting from the incineration of the radioactive waste through outlet line 86 containing a suitable particulate filter 92 and a compressor 94 and then through the valved filter-forming gas inlet line 82 until the filter layer 38 is formed or reformed. At that point the valve 88 in the outlet 86 may be closed and the valve 90 in the outlet 24 opened so that the gaseous products are discharged from the vessel 60 through the filter 62.

As the radioactive waste is incinerated within the fluidized bed 28, the filters 10 remove essentially all of the particulate matter from the gaseous combustion products passing through the filters. However, in the event that one or more of the candle filters 10 fail and thereby pass an excessive amount of particulate material therethrough, the gas-borne particulate material will contact the filter 62 and form a deposit at the filter to change or create a pressure differential across the filter 62. Such a creation or change in the pressure differential across the filter 62 may be readily sensed by employing a conventional pressure differential sensing mechanism shown generally at 96. When this deposit of particulates occurs on the filter 62, the operation of the incinerator is terminated and the valves to the various inlets and outlets closed so that the vessel 60 can be taken off-line without discharging radioactive particulate material into the environment.

It will be seen that the present invention provides a significant improvement in filtering mechanisms utilized for the filtering or cleaning of process gas streams. Inasmuch as the filters are formed in-situ within a fluidized bed from the bed material, the resulting filters are able to provide for the removal of the particulate material at least to the extent provided by the better filters previously used.

What is claimed is:

1. A filter in combination with a fluidized bed comprising a vessel having a chamber therein for containing a bed of granular material, inlet means underlying the bed of granular material for introducing at least one stream of gas into the chamber for fluidizing the bed of granular material, outlet means overlying the bed of granular material for the discharge of said at least one stream of gas from the chamber after passing through the fluidized bed of granular material, and filter means within said chamber adapted to be contacted by a particulate laden gas stream for removing particulate material borne by the gas stream contacting the filter means prior to the discharge of the gas stream from the chamber, said filter means comprising a ceramic or metal membrane characterized by having throughgoing pores of size larger than at least a minor portion of the granular material and the particulate material borne by the said gas stream and a layer of granular material from said bed on surface regions of the membrane exposed to the particulate laden gas stream, said layer of granular material being supported on said surface regions of the membrane by said gas stream and having a sufficient porosity for the passage of said gas stream therethrough while filtering therefrom virtually all of the granular material and the particulate material borne thereby including essentially all of said minor portion of the granular material prior to the passage of the gas stream through the pores in the membrane and the discharge thereof from said chamber through said outlet means.

2. A filter in combination with a fluidized bed as claimed in claim 1, wherein the bed of granular material is substantially formed of granules of a particle size fraction adequate to provide said layer with the porosity sufficient to provide for the passage of said gas stream therethrough while filtering virtually all of granular and particulate material from the gas stream passing through the filter.

3. A filter in combination with a fluidized bed as claimed in claim 2, wherein the bed of granular material is predominately formed of granules of a size greater than about 100 microns.

4. A filter in combination with a fluidized bed as claimed in claim 2, wherein said filter means comprise at least one elongated tubular membrane closed at one end and open at the opposite end thereof, wherein the open end of said membrane is in communication with the outlet means, and wherein barrier means are disposed within said chamber for isolating the open end of the membrane from said surface regions thereon.

5. A filter in combination with a fluidized bed as claimed in claim 4, wherein the membrane is provided by a perforated metal screen means supported on outer surface portions of a perforated metal or ceramic tubular member for defining the surface regions of the membrane, and wherein the perforations through said metal screen means are of a size which correspond to a throughgoing pore size smaller than the pores in said tubular member.

6. A filter in combination with a fluidized bed as claimed in claim 4, wherein the filter means are vertically oriented within said chamber with a substantial portion of the elongated membrane extending into the bed of granular material when fluidized, wherein said barrier means comprises apertured plate means horizontally disposed in said chamber at a location overlying the bed of granular material, and wherein said membrane is disposed within the aperture in the plate means with the surface regions of the membrane underlying the plate means.

7. A filter in combination with a fluidized bed as claimed in claim 4, wherein the filter means are horizontally disposed within said chamber at a location overlying the bed of granular material, wherein the outlet means are in a side wall of the vessel, wherein gas receiving means are disposed intermediate the open end of the tube and the outlet means, wherein the barrier means isolate an end portion of the tube at a location in registry with the gas receiving means and separate from the surface region on the membrane.

8. A filter in combination with a fluidized bed as claimed in claim 2, wherein said filter means comprises a planar membrane having an upper surface in communication with the outlet means and lower surface providing the surface regions of the membrane, and wherein the barrier means are provided by surface regions of said vessel in contact with peripheral surface regions of the planar membrane, and wherein the membrane is provided by a porous metal or ceramic plate having throughgoing pores larger than said minor portion of the granular material.

9. A filter in combination with a fluidized bed as claimed in claim 8, wherein the membrane further comprises perforated metal screen means supported on outer surface portions of said plate for defining the surface regions of the membrane, and wherein the perforations through said metal screen means correspond to a throughgoing pore size smaller than the pores in said tube.

10. A filter in combination with a fluidized bed as claimed in claim 2, wherein the granular material is selected from silicon oxide, silicon nitrite, or crushed stone.

11. A filter in combination with a fluidized bed as claimed in claim 2, wherein the granular material providing said bed and said layer is at least partially formed of a material chemically reactive with gaseous sulfur compounds borne by the particulate laden gas for removing sulfur compounds therefrom as it passes through the fluidized bed and the filter means.

12. A filter in combination with a fluidized bed as claimed in claim 11, wherein the chemically reactive material is selected from calcium carbonate, calcium oxide, activated carbon, sodium carbonate, alumina silicate, zinc ferrite, or zinc titanate.

13. A filter in combination with a fluidized bed as claimed in claim 2, wherein the particulate laden gas is introduced into said chamber through said inlet means.

14. A filter in combination with a fluidized bed as claimed in claim 2, wherein a plurality of gas streams are sequentially introduced into said chamber through said inlet means, wherein a first of said plurality of gas streams is a stream of essentially particulate-free gas for entraining granular material from the bed of granular material to form said layer of granular material, and wherein a second of said plurality of gas streams is the particulate laden gas stream introduced into said chamber after forming said layer of granular material.

15. A filter in combination with a fluidized bed as claimed in claim 2, wherein conveying means are in said vessel at a location overlying the inlet means and in registry with the bed of granular material for introducing combustible organic containing material into said bed, wherein conduit means are coupled to said inlet means for introducing a sufficient volume of fuel and a gaseous combustion supporting medium into said chamber for fluidizing said bed and effecting the combustion of organic material in the fluidized bed, wherein the particulate-laden gas is provided by gaseous combustion products resulting from the combustion of the fuel and the orgainic material, and wherein discharge means are in communication with the fluidized bed for removing substantially organic-free ash from the fluidized bed.

16. A filter in combination with a fluidized bed as claimed in claim 14, wherein the organic containing material is low level radioactive waste.

17. A filter in combination with a fluidized bed as claimed in claim 15, wherein the membrane is of a tubular configuration.

18. A filter in combination with a fluidized bed as claimed in claim 15, wherein the membrane is provided by a perforated metal or ceramic tubular member and perforated metal screen means supported on outer surface portions of said tubular member for defining said surface regions of the membrane, and wherein the perforations through said metal screen means correspond to a throughgoing pore size smaller than the perforations through in said tubular member.

19. A filter in combination with a fluidized bed as claimed in claim 18, wherein gas filtering means are disposed in said chamber at a location intermediate said filter means and said outlet means, wherein said gas filtering means comprises a porous metal or ceramic body having throughgoing pores slightly larger than those provided in said layer, and wherein sensing means are provided for determining a pressure drop across said gas filtering means indicative of a deposit of particulate material on a surface of said filtering means.

20. A filter in combination with a fluidized bed as claimed in claim 19, wherein further outlet means are in registry with said chamber at a location overlying said filter means for by-passing said gas filtering means during the formation of said layer.

21. A method for forming in situ a filter for filtering particulate material from a particulate laden gas stream, comprising the steps of exposing a surface region of a relatively porous ceramic or metal membrane to a bed of fluidizable granular material, passing a stream of gas through the bed of granular material for fluidizing the bed and entraining granular material therefrom and contacting the exposed surface region of the membrane with the gas stream laden with granular material from said bed for removing all but a minor portion of the granular material from the gas stream as it passes through the membrane to effect and maintain the deposit of granular material removed from the gas stream on the surface region of the membrane, contacting the surface region of the membrane for a sufficient duration to form in situ a layer of granular material on the surface region of the membrane with said layer being of a porosity substantially less than that of the membrane so as to form in combination with the membrane a particulate filter capable of removing virtually all particulate material and granular material from said bed borne by a particulate-laden bed-fluidizing gas stream as it flows from said bed of granular material through said filter and contacts and passes through the filter.

22. A method as claimed in claim 21, wherein the granular material in said bed is of a particle size fraction larger than about 100 microns.

23. A method as claimed in claim 22, wherein the granular material is substantially provided by silicon oxide, silicon nitrite, or crushed stone.

24. A method as claimed in claim 22, wherein the granular material is substantially provided by calcium oxide, calcium carbonate, activated carbon, sodium carbonate, alumina silicate, zinc ferrite, or zinc titanate or mixtures thereof with silicon oxide, silicon nitrite, or crushed and sized stone for chemically reacting with and removing sulfur compounds from the particulate laden gas as it passes through said bed and said filter means.

25. A method as claimed in claim 22, wherein the gas stream laden with granular material is separate from the particulate laden gas stream.

26. A method as claimed in claim 25, wherein the particulate-laden gas stream is passed through the bed and the filter means subsequent to the formation of the layer of granular material on the membrane.

27. A method as claimed in claim 21, including the additional steps of introducing organic-containing material into the fluidizable bed of granular material, introducing a fuel and air mixture into said fluidizable bed of granular material for effecting the combustion of organics in the organic-containing material, and wherein the particulate-laden gas stream is provided by gaseous combustion products resulting from the combustion of the fuel and the organics in the organic-containing material.

28. A method as claimed in claim 27, wherein the organic-containing material comprises low level radioactive waste.

* * * * *